(12) United States Patent
Lenhof et al.

(10) Patent No.: US 7,071,450 B2
(45) Date of Patent: Jul. 4, 2006

(54) HEATING DEVICE FOR THE MANUFACTURE OF GOLF CLUBS

(75) Inventors: Konrad Lenhof, Vista, CA (US); Jerry V. Blanke, Murrieta, CA (US); Gioacchino S. Glorioso, Valley Center, CA (US); Alan Bettencourt, Solana Beach, CA (US)

(73) Assignee: Callaway Golf Company, Carlsbad, CA (US)

( * ) Notice: Subject to any disclaimer, the term of this patent is extended or adjusted under 35 U.S.C. 154(b) by 75 days.

(21) Appl. No.: 10/904,004

(22) Filed: Oct. 19, 2004

(65) Prior Publication Data

US 2006/0081611 A1    Apr. 20, 2006

(51) Int. Cl.
    *H05B 3/58* (2006.01)

(52) U.S. Cl. .................................... 219/535; 219/200
(58) Field of Classification Search .................. None
    See application file for complete search history.

(56) References Cited

U.S. PATENT DOCUMENTS 5,531,444 A * 7/1996 Buettner ..................... 473/349

* cited by examiner

*Primary Examiner*—Thor S. Campbell
(74) *Attorney, Agent, or Firm*—Michael A. Catania; Elaine H. Lo

(57) ABSTRACT

A heating apparatus (20) and method for heating golf clubs (30) during assembly is disclosed herein. The heating apparatus (20) preferably includes a frame (22), a club retention mechanism (24), a rotating mechanism (26) and a heating mechanism (28). The heating apparatus (20) is used to cure an adhesive to bond a shaft (34) to a golf club head (32).

18 Claims, 7 Drawing Sheets

HEATING DEVICE FOR THE MANUFACTURE OF GOLF CLUBS

BACKGROUND OF THE INVENTION

1. Field of the Invention

The present invention generally relates to heating devices for use in the manufacture of golf clubs. More specifically, the present invention relates to a heating device for curing epoxy used to adhere a shaft to a golf club head.

2. Description of the Related Art

The attachment of a shaft to a golf club head requires securing the shaft to the golf club head in a manner that can withstand the tremendous forces exerted during swinging and impact with a golf ball. The attachment mechanism could encompass compressive forces, chemical adhesion and/or mechanical means. One preferred manner for attaching a shaft to a golf club head is using an epoxy to secure the shaft within a hosel. This attachment procedure is usually performed manually, with an operator overcoating a tip end of the shaft with epoxy, and then inserting the shaft into the hosel wherein excess epoxy (2 to 4 grams) is flushed onto the golf club head. In a golf club head with a through-bore, the tip end of the shaft extends through the bore in the sole of the golf club head and is cut during the assembly process. This attachment procedure typically requires heating the golf club in an oven for two hours to cure the epoxy and secure the shaft to the golf club head.

During the curing period, a series of golf clubs move on a rack through the oven. The entire oven is maintained at a set temperature that will cure the epoxy within a couple of hours. The ovens typically operate at a temperature ranging from 100° F. to 190° F. The size of the ovens may vary from several hundred square feet of floor space to thousands of square feet of floor space. The ovens have a mass typically ranging 4,000 to 6,000 pounds. Such ovens occupy large amounts of floor space in a factory and use excessive amounts of energy to heat the entire enclosed volume of the oven. Thus, there is a need for an improvement in the curing of epoxy when attaching a shaft to a golf club head.

BRIEF SUMMARY OF THE INVENTION

One aspect of the present invention is a heating apparatus for the manufacture of golf clubs. The heating apparatus includes a frame, a club retention mechanism within the frame, a rotating mechanism for rotating the club retention mechanism, and a heating mechanism for generating heat within the frame.

Another aspect of the present invention is a method for manufacturing golf clubs. The method includes placing a plurality of golf clubs on a club retention mechanism. Next, the club retention mechanism is rotated in a circular manner about a central axis. Each of the plurality of golf clubs is then heated at a specific location as it rotates with the club retention mechanism about the central axis to cure the adhesive and adhere the shaft to the golf club head.

Yet another aspect of the present invention is a heating apparatus for the manufacture of golf clubs. The heating mechanism includes a frame, means for retaining a plurality of clubs within the frame, means for rotating the plurality of clubs within the frame, and means for heating each of the plurality of golf clubs within the frame.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
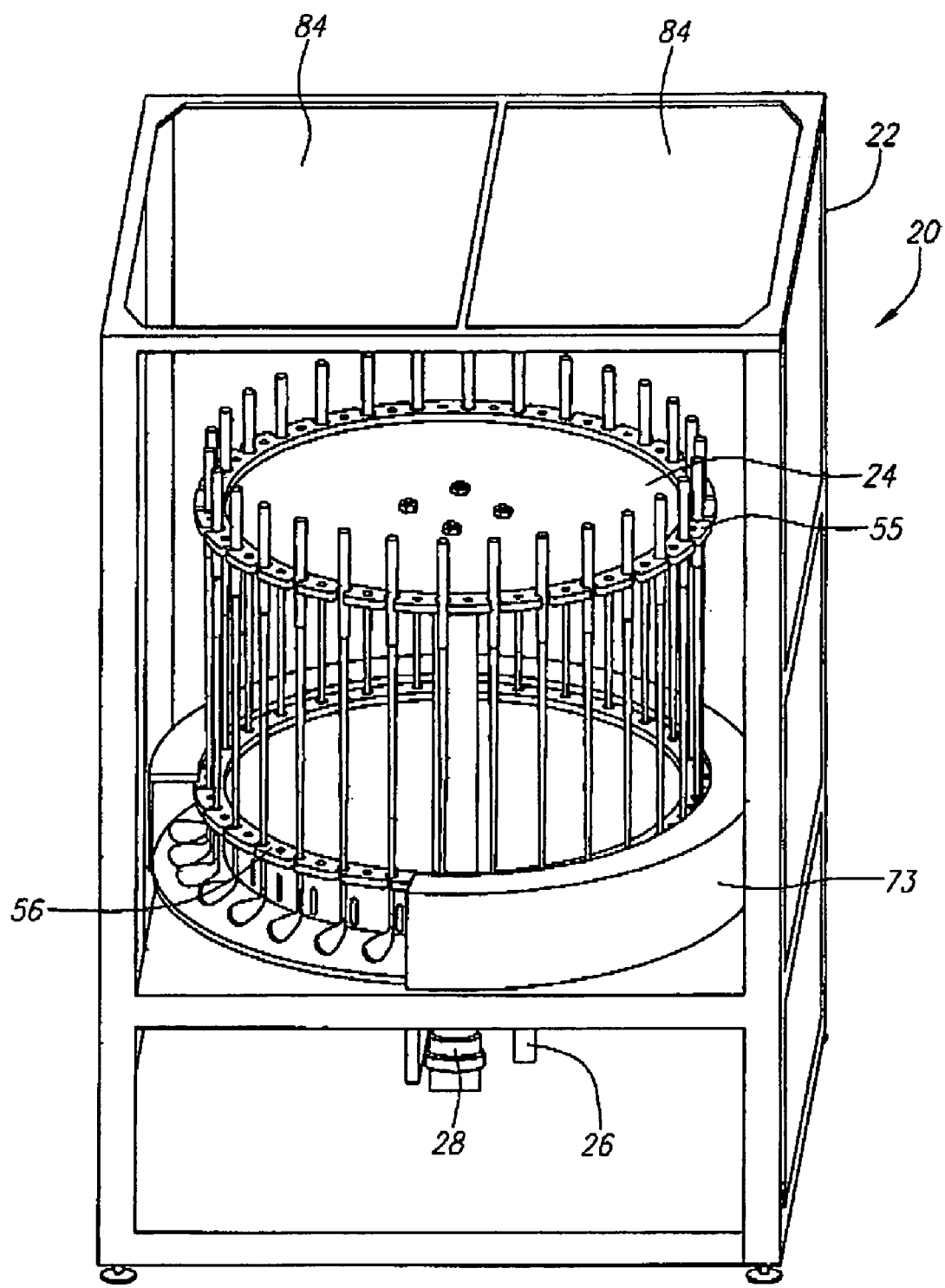
FIG. 1 is a front perspective view of an apparatus of the present invention with golf clubs.
Figure 2:
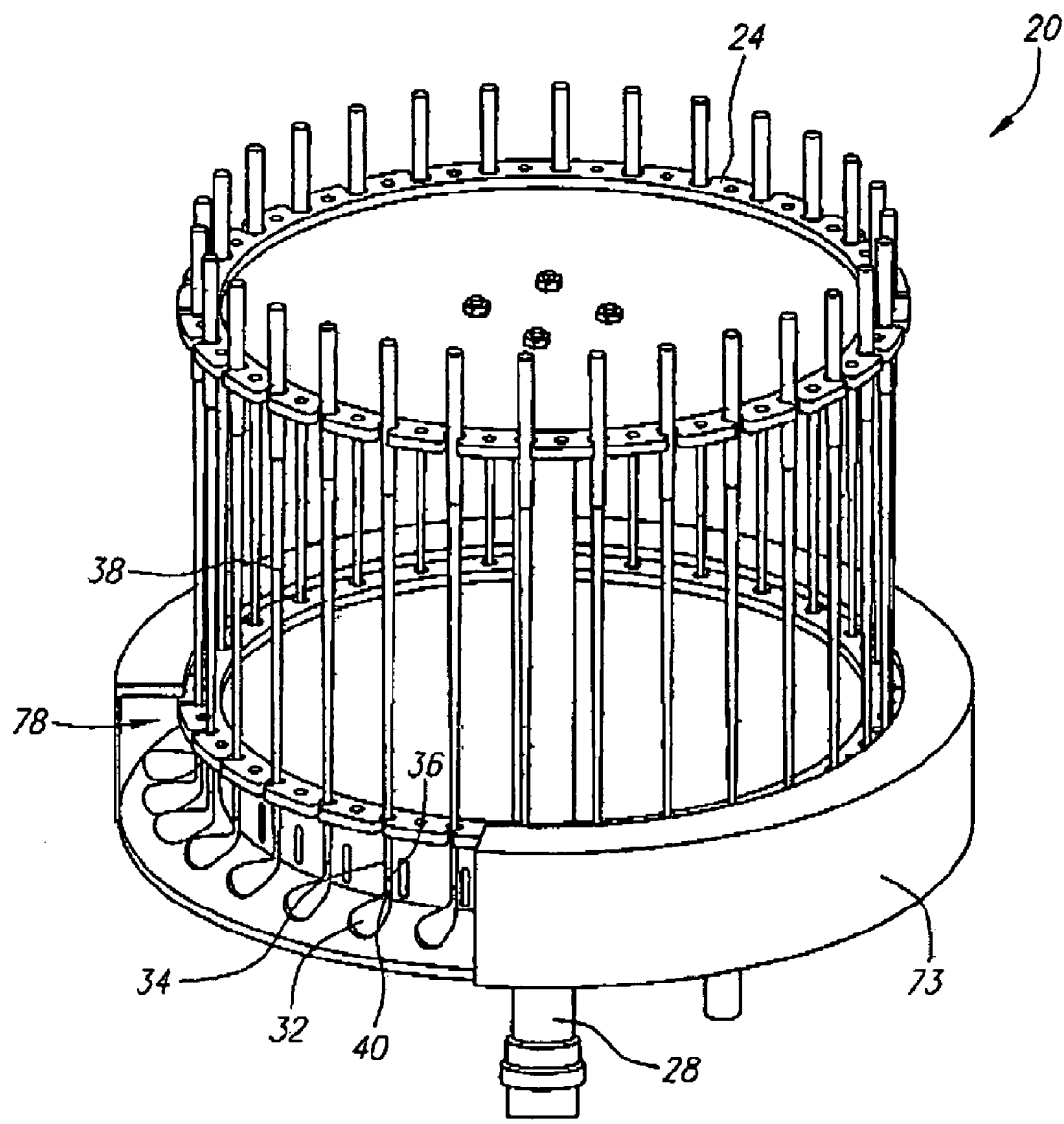
FIG. 2 is an isolated view of components of the apparatus of FIG. 1 with golf clubs.
Figure 3:
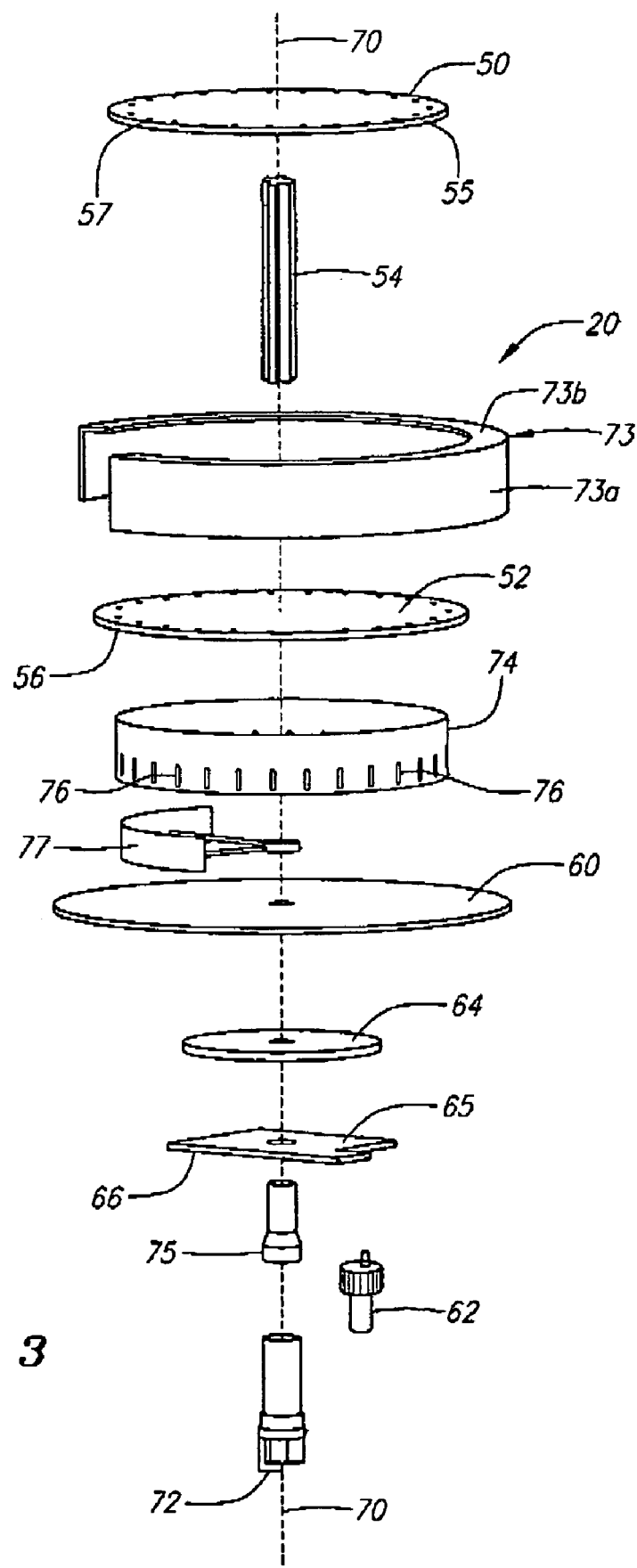
FIG. 3 is an exploded view of components of the apparatus of the present invention.
Figure 4:
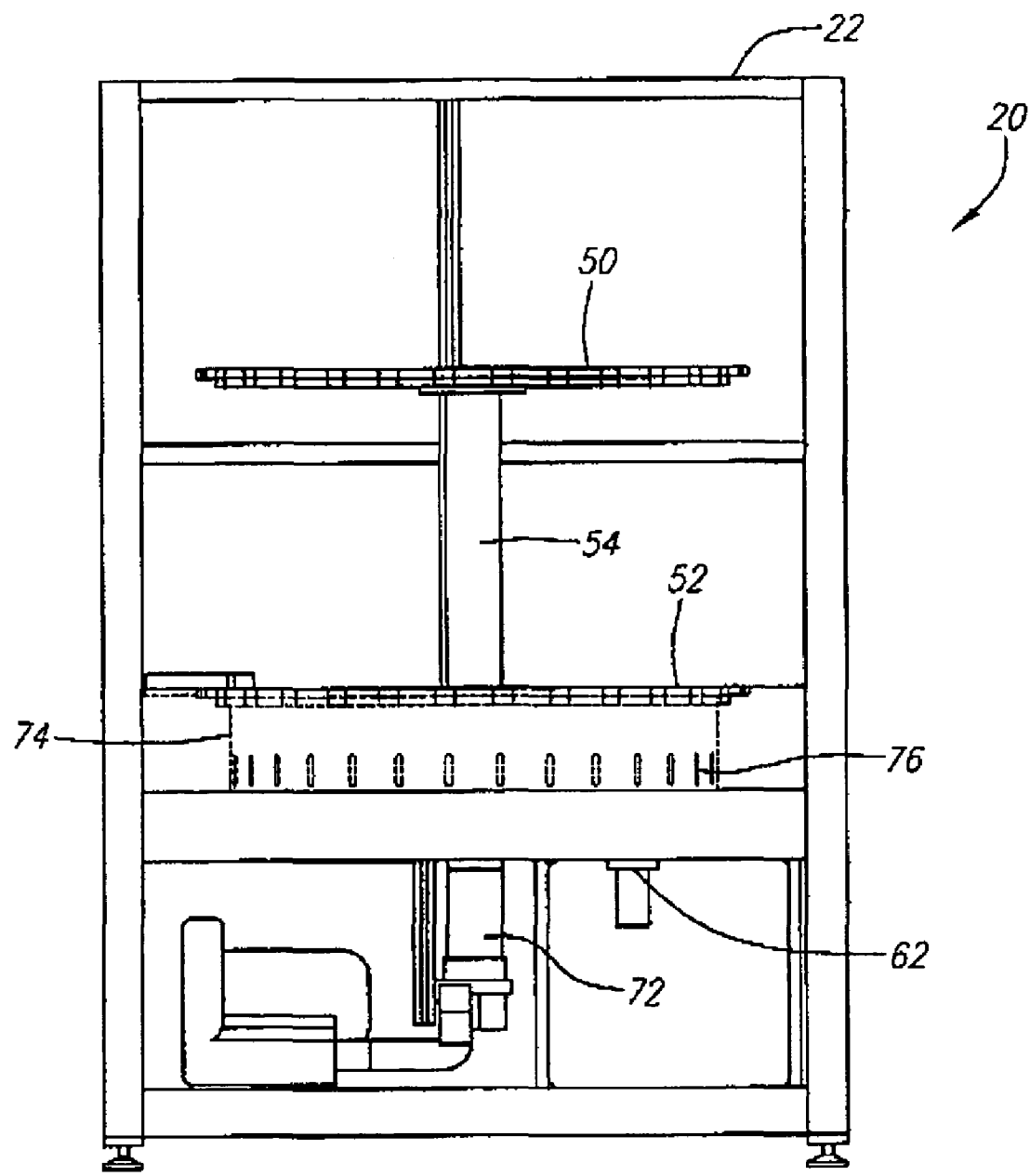
FIG. 4 is a side view of the apparatus of the present invention.
Figure 5:
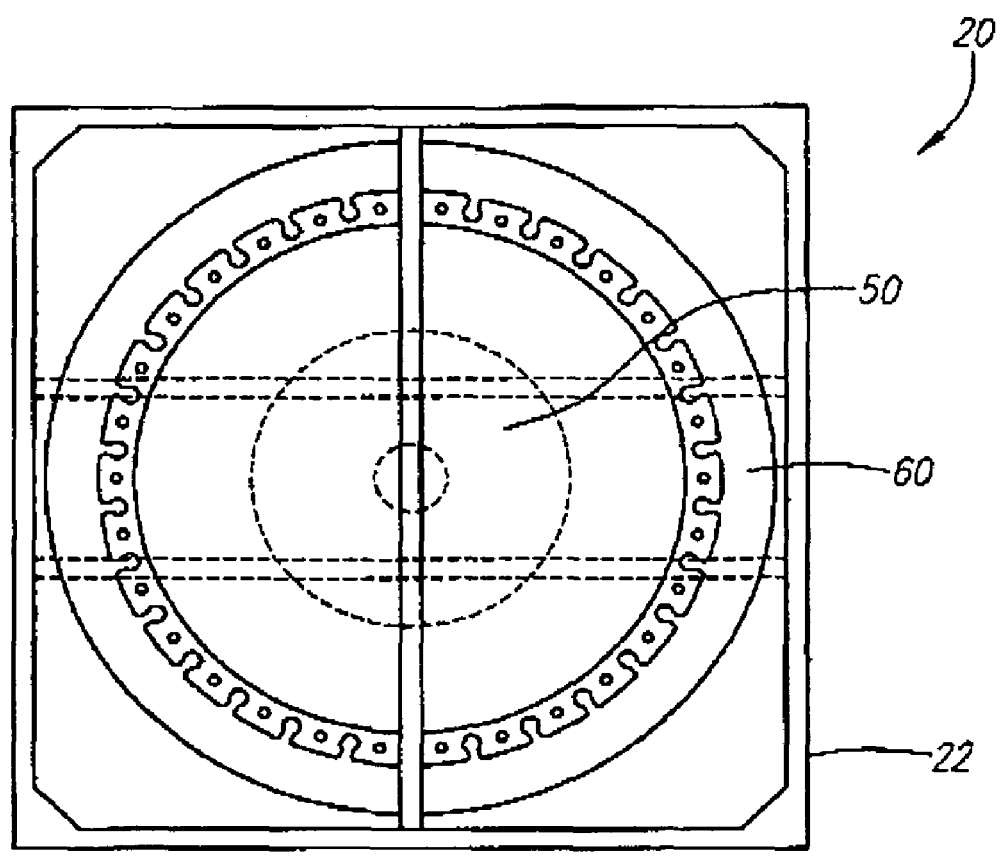
FIG. 5 is a top view of the apparatus of FIG. 4.
Figure 6:
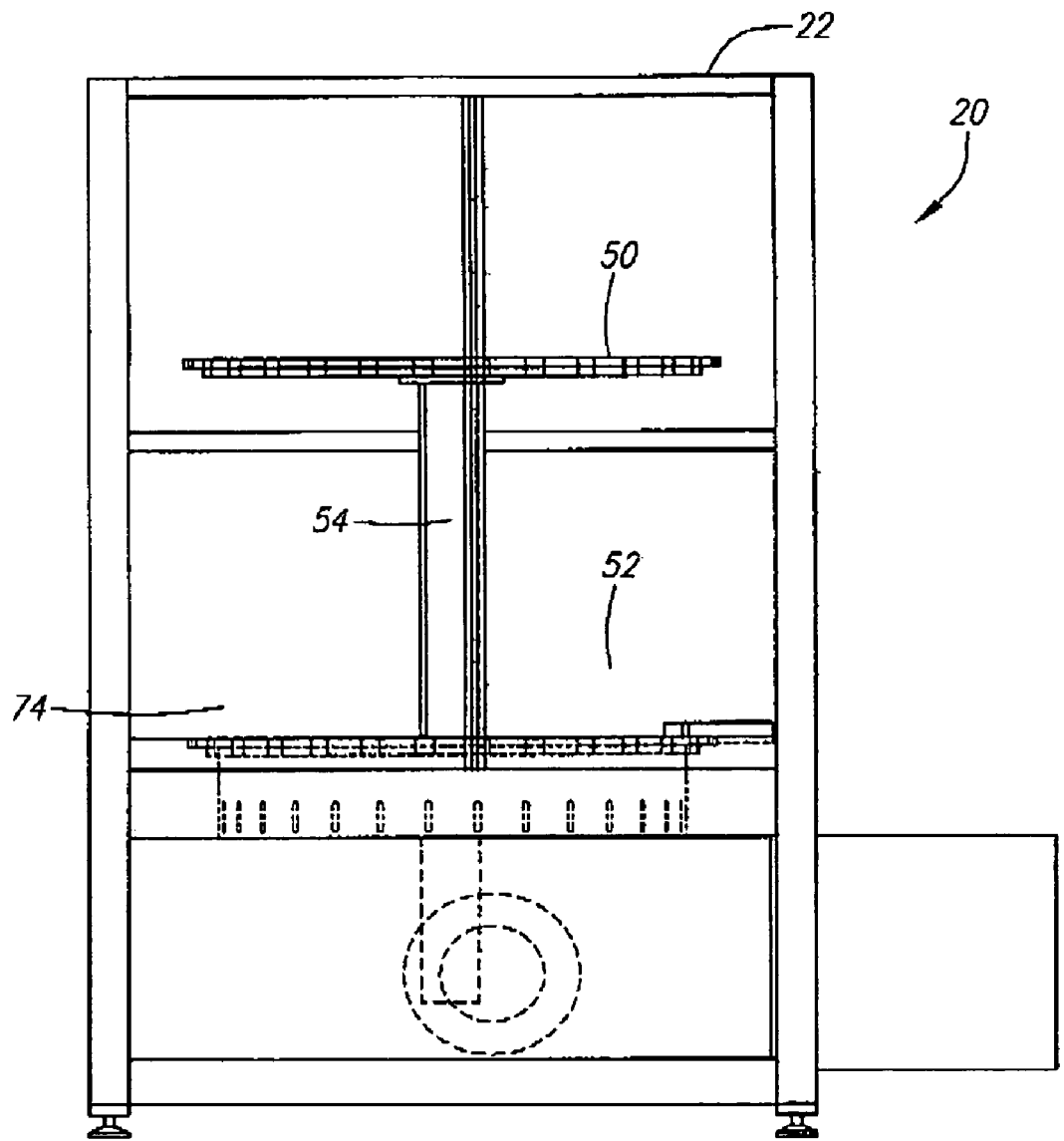
FIG. 6 is a front view of the apparatus of FIG. 4.
Figure 7:
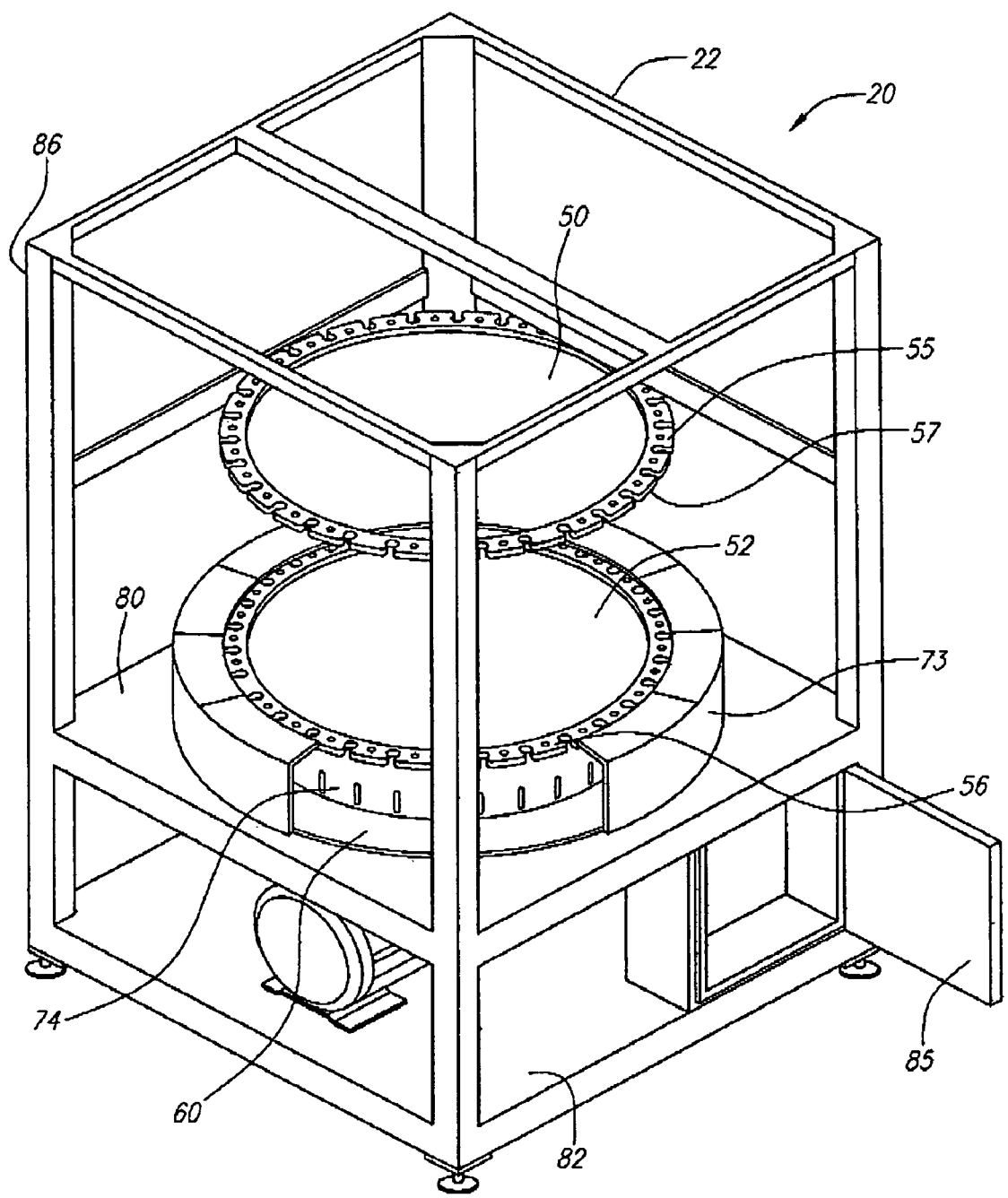
FIG. 7 is a top perspective view of an apparatus of the present invention.

As illustrated in FIGS. 1–7, a heating apparatus of the present invention is generally designated 20. The heating apparatus 20 is utilized to heat partially finished golf clubs 30 in order to cure an adhesive to adhere a golf club head 32 to a shaft 34. The heating apparatus 20 preferably includes a frame 22, a club retention mechanism 24, a rotating mechanism 26 and a heating mechanism 28.

In practice a multitude of golf clubs 30, preferably ranging from 10 to 60 and more preferably from 20 to 40, are positioned within the club retention mechanism 24 of the heating apparatus 20. The golf clubs 30 preferably have an adhesive, such as an epoxy, applied to a tip end 36 of the shaft 34. The tip end 36 of the shaft is placed within a hosel 40 of the golf club head 32, which may also be coated with the adhesive. The application of heat to the adhesive bonds the tip end 36 of the shaft 34 to the hosel 40 of the golf club head 32. The heating apparatus 20 may be utilized for woods, irons and putters. As explained in greater detail below, the heating apparatus 20 is able to perform the adhesion process in a more efficient manner than the prior art.

The club retention mechanism 24 preferably comprises an upper index plate 50 and a lower index plate 52. A bolt assembly 54 is preferably used to connect the upper index plate 50 and the lower index plate 52. The upper index plate 50 is preferably flat and composed of a metal material, such as stainless steel or aluminum. Alternatively, the upper index plate 50 may be composed of wood or medium density fiberboard (MDF). The upper index plate 50 preferably has a plurality of slots 55 located along an edge 57 thereof. The number of slots 55 preferably ranges from 10 to 60, more preferably from 20 to 40, and most preferably 30. The lower index plate 52 is also preferably flat and composed of a metal material, such as stainless steel or aluminum, or a wood material, such as MDF. The lower index plate 52 preferably has a plurality of slots 56 located along an edge 58 of the lower index plate 52. The number of slots 56 preferably ranges from 10 to 60, more preferably from 20 to 40, and most preferably 30. Generally, the number of slots 55 in the upper index plate 50 equals the number of slots 56 in the lower index plate 52. In a preferred embodiment, the upper index plate 50 has a diameter that is less than the diameter of the lower index plate 52.

In practice, the butt end 38 of the shaft 34 of each golf club 30 is placed within a slot 55 of the upper index plate 55.

A grip 37 is preferably attached to the butt end 38, however, the heating process may occur without the grip 37. The tip end 36 of the shaft 34 of each golf club 30 is placed within a corresponding slot 56 of the lower index plate 52. The shaft 34 is placed within the slot 56 slightly above the hosel 40 of the golf club head 32. In a preferred embodiment the club retention mechanism 24 supports thirty golf clubs 30, with the golf clubs 30 spaced at intervals of twelve degrees. In an alternative embodiment the club retention mechanism 24 supports forty golf clubs 30, with the golf clubs 30 spaced at intervals of nine degrees. In yet another alternative embodiment the club retention mechanism 24 supports twenty golf clubs 30, with the golf clubs 30 spaced at intervals of eighteen degrees. The club retention mechanism 24 maintains the golf clubs 30 within the heating apparatus 20 during the heating process.

The rotation mechanism 26 preferably includes a turntable 60 and a gear motor 62. Additionally, the rotation mechanism 26 preferably includes a drive wheel 64 and a sub-plate 65 with a cam follower 66. In operation, the rotation mechanism 26 rotates the golf clubs 30 and the club retention mechanism 24 about a central axis 70 of the heating apparatus 20. The rotation mechanism 26 preferably rotates the golf clubs 30 at a speed of one revolution per five minutes to one revolution per twenty minutes, and more preferably at one revolution per ten minutes to one revolution per fifteen minutes. The gear motor 62, which is preferably powered by electricity, drives the turntable 60. The turntable 60 is preferably a flat circular sheet onto which the golf clubs 30 rests. As the turntable 60 rotates, the golf clubs 30 rotate about the central axis 70. In a most preferred embodiment, the gear motor 62 drives the drive wheel 64 which drives the turntable 60.

The heating mechanism 28 preferably includes a heater 72, a heating shroud 73, an annular wall 74 and a heat duct 75. Preferably, the annular wall 74 has a plurality of apertures 76 for flowing the heat from the heater 72 onto a specific location of the golf clubs 30. The number of apertures 76 preferably corresponds to the number of slots 56 and 57 in the upper and lower plates 50 and 52, respectively. The heating mechanism 28 also preferably includes an air-break member 77 for blocking heat at certain locations. The temperature generated by the heater 72 preferably ranges from 100° F. to 400° F., more preferably from 200° F. to 300° F., and is most preferably approximately 240° F. The heat generated by the heater 72 flows through the heat duct 75 into a space defined by the annular wall 74, the lower index plate 52 and the turntable 60. The heat flows from this space through each of the plurality of apertures 76 and is directed at a specific location on the golf clubs 30 to heat the adhesive and bond the shaft 34 to the golf club head 32. The heating shroud 73 retains the heat within a defined space in order to conserve heat. The air-break member 77 prevents the flow of heat through a multitude of apertures 76, preferably ranging from four to fifteen apertures, and more preferably eight apertures. The heating shroud 73 is preferably semi-circular with an opening 78. The heating shroud 73 preferably extends around 50% to 90% of the annular wall 74, more preferably 60% to 80% of the annular wall 74. The heating shroud 73 is preferably composed of a heat resistant metal material such as steel. The heating shroud 73 preferably has a side wall 73a and a top wall 73b. The heating shroud 73 allows the heat to be directed only where it is needed, as opposed to the prior art which heated the entire golf club in a huge chamber.

The frame 22 preferably includes a skeletal structure 86, a tabletop 80 and a base 82. The skeletal structure 86 is preferably composed of stainless steel or a similar material. The frame 22 also preferably includes a plurality of windows 84. Preferably, the windows 84 are composed of a polycarbonate material and are preferably transparent. A control panel 85 is also located on the frame 22. The tabletop 80 provides a platform for the upper components of the heating apparatus 20 and the base 82 provides a platform for the lower components of the heating apparatus 20. The frame 22 preferably has a width that equals its length, and a height that is greater than the width. In a most preferred, the width and length preferably range from 40 inches to 60 inches, and most preferably 51 inches, and the height preferably ranges from 60 inches to 100 inches, more preferably from 70 inches to 90 inches, and most preferably 84 inches. The mass of the heating apparatus 20 preferably ranges from 200 pounds to 1000 pounds, more preferably from 400 pounds to 600 pounds, and most preferably 500 pounds. As compared to the prior art, the heating apparatus 20 of the present invention occupies less space, uses less energy, has a lower mass, and can perform the curing process faster.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A heating apparatus for the manufacture of golf clubs comprising:
   a frame;
   a club retention mechanism within the frame, wherein the club retention mechanism comprises an upper plate having a plurality of slots and a lower plate comprising a plurality of slots;
   a rotating mechanism for rotating the club retention mechanism; and
   a heating mechanism for generating heat within the frame.

2. The heating apparatus according to claim 1 wherein the heating mechanism comprises a heater, a heating duct in flow communication with the heater, an annular wall having a plurality of apertures in flow communication with the heating duct, and a heating shroud surrounding a portion of the annular wall.

3. The heating apparatus according to claim 1 wherein the rotating mechanism comprises a gear motor, a drive wheel connected to the gear motor, and a turntable connected to the drive wheel.

4. The heating apparatus according to claim 1 further comprising a plurality of windows attached to the frame to enclose the club retention mechanism, the heating mechanism and the rotating mechanism.

5. The heating apparatus according to claim 1 wherein the plurality of slots of the upper plate ranges from 20 to 40 slots and the plurality of slots of the lower plate ranges from 20 to 40 slots.

6. The heating apparatus according to claim 1 wherein the upper plate and the lower plate are circular plates having a thickness ranging from 0.10 inch to 4.00 inches.

7. The heating apparatus according to claim 2 wherein the plurality of apertures of the annular wall ranges from 20 to 40.

8. The heating apparatus according to claim 2 wherein the heating mechanism further comprises an air-break wall positioned within the annular wall the air-break wall extending along a portion of the annular wall.

9. The heating apparatus according to claim 1 wherein the heating mechanism operates at a temperature ranging from 100° F. to 400° F.

10. The heating apparatus according to claim 1 wherein the rotation mechanism rotates in a range of one revolution per five minutes to one revolution per twenty minutes.

11. The heating apparatus according to claim 1 wherein the club retention mechanism further comprises a bolt assembly having an upper end and a lower end, the upper plate mounted on the upper end of the bolt assembly and the lower plate mounted on the lower end of the bolt assembly.

12. The heating apparatus according to claim 11 wherein the bolt assembly has a length ranging from 20 inches to 60 inches.

13. The heating apparatus according to claim 2 wherein the heating shroud extends around fifty percent to eighty percent of the annular wall.

14. A heating apparatus for the manufacture of golf clubs comprising:
a frame;
means for retaining a plurality of clubs within the frame;
means for rotating the plurality of clubs within the frame; and
means for heating each of the plurality of golf clubs within the frame.

15. The heating apparatus according to claim 14 wherein the retaining means comprises an upper plate having a plurality of slots and a lower plate comprising a plurality of slots.

16. The heating apparatus according to claim 14 wherein the heating means comprises a heater, a heating duct in flow communication with the heater, an annular wall having a plurality of apertures in flow communication with the heating duct, and a heating shroud surrounding a portion of the annular wall.

17. The heating apparatus according to claim 14 wherein the rotating means comprises a gear motor, a drive wheel connected to the gear motor, and a turntable connected to the drive wheel.

18. The heating apparatus according to claim 14 further comprising a plurality of windows attached to the frame to enclose the club retention mechanism, the heating mechanism and the rotating mechanism.

* * * * *